US009276752B2

United States Patent
Abraham et al.

(10) Patent No.: US 9,276,752 B2
(45) Date of Patent: Mar. 1, 2016

(54) SYSTEM AND METHOD FOR SECURE SOFTWARE UPDATE

(75) Inventors: Bestin Abraham, Newark, DE (US); Kerry Miller, Elkton, MD (US)

(73) Assignee: Siemens Healthcare Diagnostics Inc., Tarrtyown, NY (US)

( * ) Notice: Subject to any disclaimer, the term of this patent is extended or adjusted under 35 U.S.C. 154(b) by 49 days.

(21) Appl. No.: 13/984,572

(22) PCT Filed: Feb. 13, 2012

(86) PCT No.: PCT/US2012/024801
§ 371 (c)(1),
(2), (4) Date: Aug. 9, 2013

(87) PCT Pub. No.: WO2012/109640
PCT Pub. Date: Aug. 16, 2012

(65) Prior Publication Data
US 2013/0318357 A1    Nov. 28, 2013

Related U.S. Application Data

(60) Provisional application No. 61/441,843, filed on Feb. 11, 2011, provisional application No. 61/523,491, filed on Aug. 15, 2011.

(51) Int. Cl.
*H04L 29/06* (2006.01)
*H04L 9/32* (2006.01)
(Continued)

(52) U.S. Cl.
CPC .......... *H04L 9/3247* (2013.01); *G06F 21/565* (2013.01); *G06F 21/57* (2013.01); *G06F 21/64* (2013.01); *H04L 9/32* (2013.01)

(58) Field of Classification Search
CPC ..................................... G06F 21/565

USPC ........................................... 713/176
See application file for complete search history.

(56) References Cited

U.S. PATENT DOCUMENTS 7,055,027 B1 *  5/2006  Gunter et al. ............... 713/151
7,502,946 B2    3/2009  Perkins et al.
(Continued)

FOREIGN PATENT DOCUMENTS

EP   1857930      11/2007
JP   2001312415   11/2001
(Continued)

OTHER PUBLICATIONS

International Search Report, International Application No. PCT/US2012/024801 dated Mar. 13, 2013.

*Primary Examiner* — Longbit Chai

(57) ABSTRACT

A secure software update provides an update utility with an update definition, a private encryption key and a public signature key to a target device. A software update package is prepared on portable media that includes an executable update program, a checksum for the program that is encrypted with a symmetrical key, an encrypted symmetrical key that is encrypted with a public encryption key and a digital signature prepared with a private signature key. The update process authenticates the digital signature, decrypts the symmetrical key using the private encryption key, and decrypts the checksum using the symmetrical key. A new checksum is generated for the executable update program and compared to the decrypted checksum. If inconsistencies are detected during the update process, the process is terminated. Otherwise, the software update can be installed with a relatively high degree of assurance against corruption, viruses and third party interference.

25 Claims, 3 Drawing Sheets

(51) Int. Cl.
*G06F 21/56* (2013.01)
*G06F 21/57* (2013.01)
*G06F 21/64* (2013.01)

(56) References Cited

U.S. PATENT DOCUMENTS

| | | |
|---|---|---|
| 7,809,955 B2 | 10/2010 | Comlekoglu |
| 8,178,040 B2 * | 5/2012 | Brauer .................... A61M 1/16 422/44 |
| 8,495,749 B2 * | 7/2013 | Alve et al. ...................... 726/26 |
| 8,689,305 B2 * | 4/2014 | Yasuhara .......................... 726/7 |
| 2002/0062451 A1 | 5/2002 | Scheidt et al. |
| 2004/0259633 A1 | 12/2004 | Gentles et al. |
| 2005/0149923 A1 * | 7/2005 | Lee ................................ 717/172 |
| 2005/0198490 A1 | 9/2005 | Jaganathan et al. |
| 2006/0277539 A1 | 12/2006 | Amarasinghe et al. |
| 2007/0033393 A1 | 2/2007 | Ganesan et al. |
| 2007/0288890 A1 | 12/2007 | Wells |
| 2008/0092235 A1 | 4/2008 | Comlekoglu |

FOREIGN PATENT DOCUMENTS

| | | |
|---|---|---|
| JP | 2004288074 | 10/2004 |
| JP | 2008165593 | 7/2008 |
| JP | 2009124520 | 6/2009 |

* cited by examiner

SYSTEM AND METHOD FOR SECURE SOFTWARE UPDATE

STATEMENT REGARDING FEDERALLY SPONSORED RESEARCH OR DEVELOPMENT

N/A

BACKGROUND OF THE INVENTION

The present disclosure relates generally to software update mechanisms that verify software prior to installation, and relates more specifically to implementation of software updates with a secure verification prior to installation.

Various types of devices running software applications, including embedded devices that often operate on a standalone basis, may be provided with software updates over the course of their useful lifetime cycle. In the case of computer devices, such as desktop PCs and other general purpose computers, updates are typically performed through a communication link, such as may be provided with a network connection to a LAN, WAN, intranet or internet. A communication link permits the computer to download or retrieve updates that can be installed on the computer with relative ease.

In the case of standalone devices that include a computational engine and software, such as is often present in embedded systems, software updates tend to be implemented with a physical component. For example, some standalone devices may be updated by replacing a ROM that is programmed to include the new software update. Another approach might be to replace a RAM card or load software into semi-permanent memory from magnetic or electronic media. In some instances, embedded systems are updated by applying a communication link, such as a network connection, to the device to upload new software.

One issue that arises in relation to the installation of software updates is the verification of the software update prior to installation and execution of the software. The verification is often conducted to ensure that the software is not corrupted, modified or infected with viruses, for example. One popular technique to verify software is to compute a checksum for a given file used for the software update installation. Often, the software update is in the form of a binary or image type file, to which a checksum algorithm can readily be applied. A typical checksum algorithm is the MD5 (Message-digest algorithm 5) algorithm, in which blocks of the file to which the algorithm is applied are combined according to a recursive algorithm to produce a highly unique number that represents the file content. MD5 is sometimes referred to as a cryptographic hash function, and provides a 128 bit hash value or checksum. Due to the extremely low likelihood that different file contents can produce the same checksum, MD5 is often used to validate the integrity of an accompanying file.

Due to the potential security issues involved for software updates, such as corruption, modification or malicious code being embedded in a software update file, techniques have been developed to further secure software files for software updates. The security measures may include techniques to secure the file content and/or the checksum value against tampering or corruption. One such security technique is the application of encryption to the file content and/or checksum value, such as may be achieved through the use of public/private key pairs used to encrypt and decrypt data. This type of asymmetric encryption uses the private key to decrypt data that is encrypted using the public key. If the software of a particular device were to be updated using this type of security, the private key would be distributed to the device to be updated, which tends to thwart the purpose of the public/private key pair security design.

Another security measure that might be used to secure data is to obtain and apply a digital certificate in conjunction with an electronic signature. The digital certificate provides a high level of verification that a document originates from a claimed source. Typically, a document or data is processed to produce a relatively unique value, such as a hash value or a checksum. The hash value or checksum is encrypted using a signer's private key of an asymmetrical public/private key pair to produce a digital signature. A digital certificate is formed using the digital signature, resulting in digitally signed data that can be transmitted and authenticated at a remote location by extracting the original data, computing the hash value or checksum for the data, decrypting the digital signature using the public key of the public/private key pair to obtain the original hash value or checksum, and then comparing the computed and transmitted hash values or checksums to determine whether the digital signature is valid and to authenticate the source and integrity of the data.

However, digital certificates are often provided with an expiration date to help ensure current validity of the certificate and resulting digital signatures. In addition, digital certificates are often checked for validity themselves to ensure they are current and valid, which checking is often accomplished over a communication link to maintain the digital certificate on an ongoing basis. In the case of standalone devices, the use of a digital certificate represents a generally costly and high maintenance security technique, that may permit the introduction of other gaps in security by assuming a communication link with the device that is to be updated.

Another approach to providing a secure update environment is to implement kernel level protection to create a trusted environment for updates. However, this approach suffers from some of the same drawbacks noted above, in that security features for software updates would be delivered to the device to permit the update, thereby exposing the security features for examination. In addition, a number of systems often operate in full kernel mode, which is typically disabled to implement a trusted environment in accordance with kernel level protection.

Yet another option for secure software updates is to utilize a hardware encrypted device with an onboard software update. However, this type of security implementation introduces compatibility issues with the device to be updated or its operating system, so that such hardware encrypted devices are not usable with a number of systems. In addition, the hardware encryption usually operates by accessing a digital certificate or asymmetrical or symmetrical encryption key, which access usually relies on a communication link provided to the device being updated.

In general, there is no apparent and readily useful technique for validating a software update prior to installation on a device that does not involve the additional cost, complexity and potential security gaps of a communication link.

BRIEF SUMMARY OF THE INVENTION

According to the present disclosure, a secure software update mechanism is provided that does not depend upon a communication link being active for the device to which the software update is applied. Prior to being installed, the software update is validated and verified using a secure mechanism to prevent installation of an update that may be corrupted, include malicious software, be unauthorized or suffer from other types of integrity/security issues. The software update can be applied using an external hardware device, such as may be attached to an input/output port of the device to be updated. Examples of the external hardware device include serial or parallel port-connectable devices, USB type devices, such as USB flash drives, as well as any other portable, connectable hardware devices that can store a software update package.

According to an exemplary embodiment, the device that is to receive the software update includes an update utility that, upon being activated, searches for specific data at a specific location on an externally connectable storage device. If the update utility locates predetermined data at a predetermined location in the externally connected storage, the validation and verification process can proceed, while a failure to detect the appropriate data and location causes the update utility to terminate.

According to an exemplary embodiment of the present disclosure, a validation and verification process is implemented by calculating checksums for files used in the software update and packaging the checksums in an executable update file. The executable update file is then processed to generate a package checksum, which is then encrypted with a symmetrical key, or session key. The session key itself is then encrypted with a public key, the complementary private key for which is embedded in the update utility resident in the device to which the software update is to be applied. The encrypted session key is then digitally signed with a private key of a public/private key pair to produce a digital signature. The private key is kept secret, such as by being securely maintained on location at the software update producer, for example. The public key of the public/private key pair is embedded in the update utility resident on the device that is to receive the software update.

The secured package checksum, secured session key and digital signature are all placed in a document, such as an XML file, which is then stored on a hardware device that is to be used to perform the update to the unit that is to receive the software update. The executable and/or data files that are used to perform the software update are also stored on the storage device to achieve a distribution package that includes all the files and data that are used to validate, verify and install the software update.

According to an exemplary embodiment of the present disclosure, a software update to a device is implemented by activating a software update utility that is resident on the device. The update utility seeks out a connected storage device, on which is located the particular files and data for conducting the update. According to an aspect of the present disclosure, the update utility may attempt to detect explicit files or data at explicit locations in the storage device, and terminate the update process if particular conditions of the data, files or locations are not met. If the update utility determines that the stored data and files are correctly named and/or located, the validation and/or verification process can begin.

The validation and/or verification process may include reading the digital signature from a document file and verifying the source of the digital signature using a public key that is embedded in the resident update utility. Verification can be implemented by using the public key to decrypt the digital signature to obtain a specific result, which can be in the form of a block of text, and in this instance can represent an encrypted session key. The so obtained result of decryption of the digital signature is compared to a specific value set, in this instance an encrypted session key, that is also read from the document file. If the decryption result and the value set match, a valid and authorized source for the updated is indicated, and the update can be permitted to proceed. If the update source is not authenticated with a match between the decryption result and the value set according to the above described technique, the update process terminates.

Assuming the digital signature is authenticated to verify an authorized source for the update, the update utility then retrieves the encrypted session key and decrypts the session key using the private key that is embedded in the update utility. The decrypted session key is then used to decrypt the package checksum value, which is compared to a calculated checksum value for the executable update file to evaluate the integrity of the executable file.

According to an aspect of the present disclosure, the update utility validates and verifies the checksum of the executable update and grants execution to the executable file if a calculated and retrieved checksum are determined to match. The update file executes to retrieve checksums for the stored files and data, and calculates additional checksums for the data and files to verify the integrity of the data and files. If the integrity can be verified, the files and data are installed for the update.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 1:
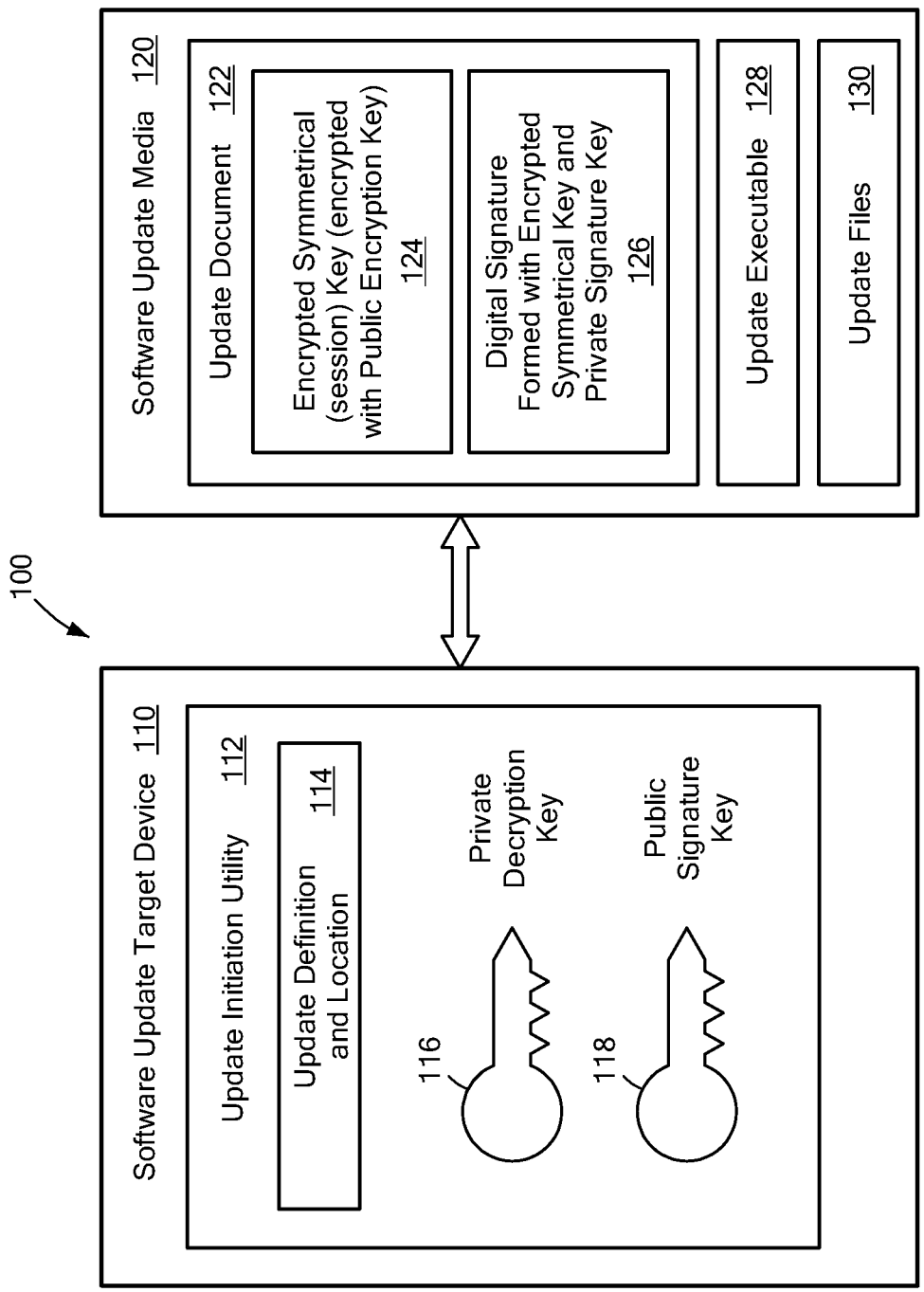
FIG. 1 is a block diagram illustrating contents of a software update target device and storage media.

The present disclosure provides systems and methods for a relatively high level of security to ensure the integrity of software updates prior to being committed to a system on which the software is intended to be executed. The security is implemented using symmetrical and asymmetrical keys for encryption and a digital signature to authenticate the update. A symmetric key encryption scheme uses a key to both encrypt and decrypt the data or document that is to be secured. Symmetric key encryption and decryption algorithms are typically more efficient than asymmetrical key algorithms, so that implementation can be less complex and/or time-consuming. However, the level of security available with a symmetrical key system scheme depends upon the secrecy of the key between the parties that use the encryption/decryption method. If the symmetrical key becomes known outside of the intended parties, the security for any data or documents that are encrypted using the symmetrical key may be compromised.

Asymmetrical key encryption and decryption uses a different key to encrypt data or documents than is used to decrypt the same data or documents. Often referred to as public/private key pairs, a public key is typically used to encrypt data that is to be securely delivered to a receiving party. The intended receiving party possesses the private key that is paired with the public key used for encryption. The private key is maintained as a secret by the receiving party, so that generally only the party possessing the private key can decrypt the message that is encrypted using the public key. The public key can be made available to anyone to be able to securely send messages to the party possessing the private key of the public/private key pair. The level of security that can be maintained by the asymmetrical key security scheme depends upon maintaining the secrecy of the private key.

Another application for asymmetrical key encryption is digital signatures, often used in digital security certificates. With this application, a private key of an asymmetrical public/ private key pair is used to encrypt, or sign, items such as data, documents or a message that might be used to send data or documents. A party wishing to verify the authenticity of the received data can apply the matching public key to verify the signature and validate the source of the data. This type of digital certificate security depends upon the secrecy of the private key used by the signing party.

The generation of symmetrical and asymmetrical keys has been well documented and is known to those skilled in the relevant art so that a further detailed description of the same is omitted. According to an exemplary embodiment of the present disclosure, a single symmetrical key may be generated and used for encryption and decryption in the application of various software updates to distinct systems. Alternately, or in addition, distinct symmetrical keys may be generated for each software update and/or each system to be updated. Likewise, a single asymmetrical public/private key pair may be generated for use in distributing secure software updates, where the private key of the pair is securely and secretly maintained by the software update source or originator. In addition, one or more distinct public/private asymmetrical key pairs may be generated for use with the secure software update, where the private key of the pair is provided to the device to which the software update is to be applied. In any event, public/private keys and symmetrical keys may be generated and maintained to be unique, which may assist in maintenance and administrative tasks, or may be generated and maintained to be distinct with respect to software updates or devices to assist in tracking devices and updates, for example.

Referring now to FIG. 1, a block diagram of a system 100 for implementing a secure software update is illustrated. System 100 includes a software update target device 110 and a software update medium 120 that stores the update related program files. Device 110 is typically implemented as a computing device with a processor and one or more types of onboard storage for storing software and data used to carry out the various operational functions of device 110. As part of the software that is stored in device 110, an update utility 112 is provided. Utility 112 may be implemented to be initiated under secure circumstances, such as by an administrator with certain access privileges that may be maintained with an ID and password, for example. Utility 112 can operate to set device 110 into a known state as part of an update process, and carry out other administrative functions in preparation for a software update. For example, utility 112 may perform security evaluations of an intended software update to verify the update prior to granting execution to an executable update program that might be loaded into memory in device 110 prior to execution by a processor in device 110.

Utility 112 is implemented to include a preset update definition 114 for initial processing of the software update. Utility 112 also includes a private decryption key 116 of a public/private asymmetrical key pair, as well as a public signature key 118 of a public/private asymmetrical key pair. The components of utility 112 are each used in turn to contribute to the security, verification and validation of the software update. For example, update definition 114 is used during the initial processing of the software update to determine if the contents of medium 120 are configured properly.

Update definition 114 may indicate a specific storage location on medium 120 for the storage of specific data expected by utility 112 upon initiation of the software update. For example, update definition 114 may include a literal or hard-coded identifier that specifies one or more of a folder location, a file location, a data location in a file or a data location defined by the hardware characteristics of medium 120 or the hardware mechanisms used to access medium 120. According to an exemplary embodiment, medium 120 may be organized with a file allocation table (FAT) file system or an NTFS (new technology file system) file system. In accordance with such a FAT or NTFS file system, update definition 114 may define a file name or code and/or a directory or folder in which the file or code is located. Utility 112 may look for the particular file names or codes that are contained within storage medium 120 as an initial test to determine if the contents of medium 120 are as expected. As an example, utility 112 may look for a file with a name of update.exe, or a tag of <update1> in an XML file in accordance with update definition 114 to determine if the contents of medium 120 are approved. The use of update definition 114 thus forms a first security threshold to contribute to ensuring the integrity of the software update. If utility 112 finds the appropriate data at the appropriate location as indicated by update definition 114, the software update process can continue, and otherwise may be terminated.

Utility 112 has access to decryption/signature keys 116, 118, which each form a half of a public/private asymmetrical key pair used in the secure software update. Key 116 is a private decryption key of a public/private asymmetrical encryption/decryption key pair while key 118 is a public signature key of a public/private asymmetrical signature key pair. Keys 116, 118 are respectively used to decrypt and to authenticate information provided on medium 120 for the software update. Various components stored on medium 120 have been encrypted with the other half of the public/private key pair corresponding to keys 116, 118. Accordingly, keys 116, 118 can be used by utility 112 to decrypt, unlock or authenticate information provided on medium 120 to verify aspects of the software update prior to installation.

Medium 120 includes an update document 122 that hosts items used to support security for the software update. For example, update document 122 may be implemented as an XML file that includes an encrypted symmetrical, or session, key, which has been encrypted with a public encryption key of a public/private asymmetrical encryption/decryption key pair. Encrypted key 124 can be decrypted using private key 116 to obtain the session key used to provide security features for the software update. In addition, update document 122 hosts digital signature 126, which is formed with encrypted symmetrical key 124 and a private signature key of public/private asymmetrical signature key pair. Digital signature 126 is designed to be authenticated using public signature key 118 of the corresponding public/private asymmetrical signature key pair.

In addition to update document 122, medium 120 stores an update executable file 128 that is used to implement the intended software update. Medium 120 also includes update files 130, which represents zero or more files that may be used in the secure software update process. According to an exemplary embodiment, update executable file 128 is granted execution control once the secure software update verification process has completed. After verification of the software update, update executable file 128 may execute to install the software update on device 110.

Update executable file 128 and/or update files 130 may include new versions of components used by utility 112 to initiate and verify the software update. For example, a new version of update definition 114, private encryption key 116 and/or public signature key 118 may be installed in device 110, potentially along with a new version of utility 112, during the installation and update process. The installation and update process may prepare device 110 for a further update at a future date by being able to provide a unique utility 112 for initiating and performing verification for a future software update.

Figure 2:
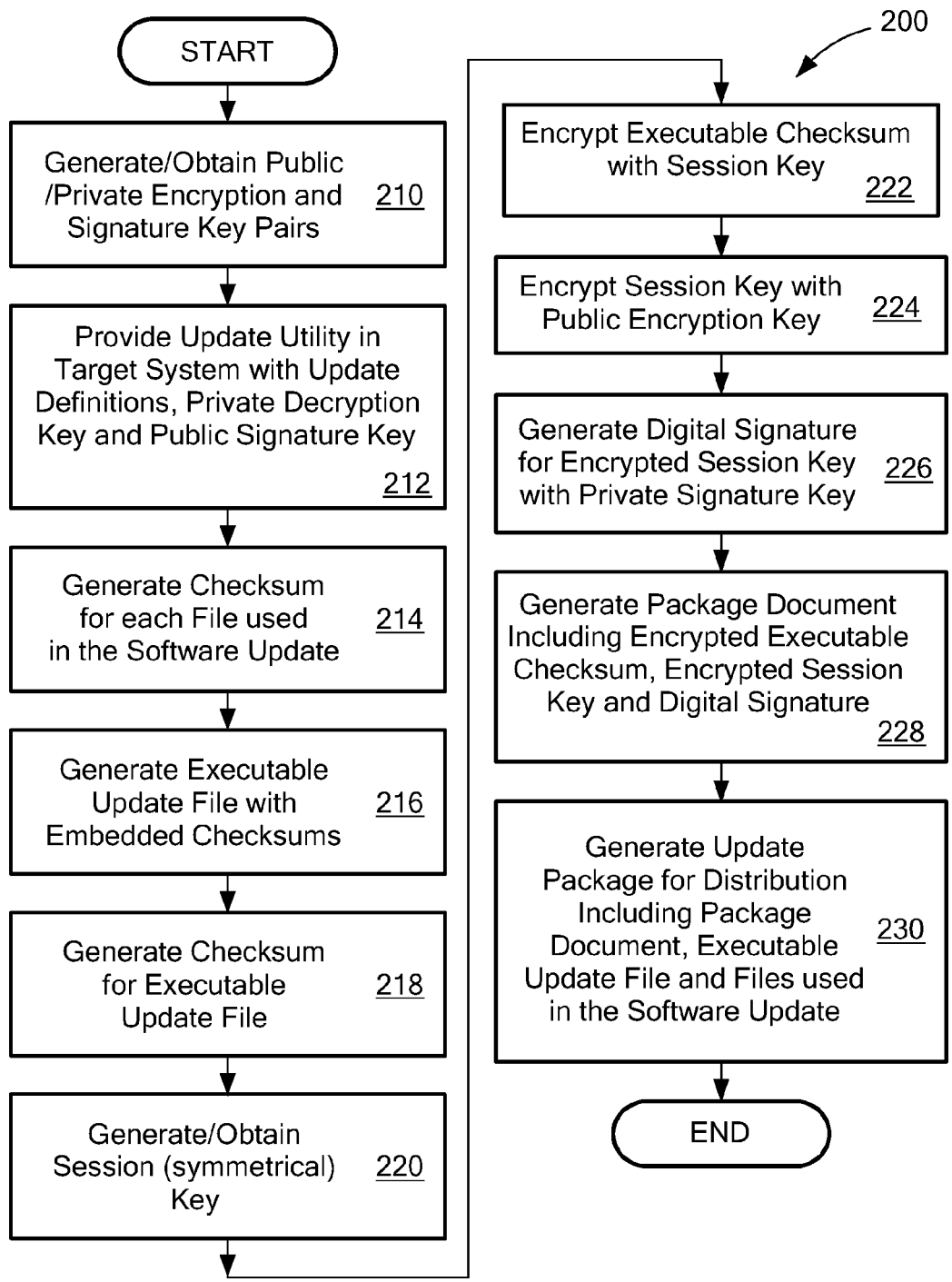
FIGS. 2 and 3 are flowcharts, respectively illustrating preparation and installation of a software update process.

Referring now to FIG. 2, a flowchart 200 illustrates a process for preparing a secure software update in accordance with the present disclosure. The process begins with a generation or acquisition of two public/private asymmetrical key pairs referred to herein as an encryption key pair and a signature key pair, as illustrated in block 210. The encryption and signature key pairs are treated in the abstract, in that either key pair could be used for encryption and/or digital certification. In the present discussion, the encryption key pair is used for encryption purposes, while the signature key pair is used for digital certificate generation and authentication.

After the encryption and signature key pairs are available, the target system or device to be updated with a software update is provided with an update utility that includes various update components. The update components may include an update definition, a private decryption key and a public signature key, as illustrated in block 212. The update definition, private decryption key and the public signature key are illustrated in utility 112 of FIG. 1. These components provided to the target device will be used to verify, validate and authenticate the software update being presented to the device. With the update utility and components established in the target device, the secure software update can be implemented in reliance on the update utility and components.

The secure software update may be composed of an update package that is distributed on a given media platform for application of the update to a given device. The update package is generated beginning with the calculation of checksum values for each of the files that are to be used in the software update installation process, as illustrated in block 214. The checksums can be generated using the MD5 algorithm to provide a relatively high level of integrity verification for the update files.

Once the checksums are calculated, an executable update file is generated, and the checksums are embedded in the executable update file, as illustrated in block 216. The embedded checksums form part of the executable image that is used to install the update in the target device once the integrity of the update is verified in accordance with the present disclosure. The executable update file is then processed to generate a checksum, as illustrated in block 218. Again, the checksum may be generated using the MD5 algorithm to obtain a relatively high level of assurance for the integrity of the executable update file.

The process continues with the generation or acquisition of a session key, which is a symmetrical encryption key, as is illustrated in block 220. The session key can be generated to be unique for the software update under production, or to be general for a given device or software update. The session key is then used to encrypt the checksum of the executable update file, as illustrated in block 222. The session key is then itself encrypted using a public encryption key of a public/private encryption/decryption key pair to form a first data block representing the encrypted session key, as illustrated in block 224. The public encryption key is maintained by the software update developer or originator to permit additional updates to the specific device and to ensure that the source for the encryption of the session key is maintained.

The process for generation of the software update package continues with the generation of a digital signature from the first data block representing the encrypted session key, as illustrated in block 226. The digital signature is generated with a private signature key of a public/private signature key pair, which is also maintained by the software update provider or originator. The private signature key is maintained in secret by the software originator or provider, to ensure that the digital signature that is used to authenticate the encrypted session key remains valid. The first data block representing the encrypted session key is encrypted using the private signature key to create the digital signature.

Once the encrypted executable checksum, encrypted session key and digital signature are generated, the items are placed in a package document that is used as part of the software update process, as illustrated in block 228. The encrypted executable checksum, encrypted session key and digital signature may take the form of XML tags or blocks of coded data that can be read and used by checksum, decryption or authentication algorithms to reverse the secure update integrity verification process. According to an exemplary embodiment, the encrypted checksum, encrypted session key and digital signature are placed in an XML formatted file as XML tags for use in the software update verification process.

The process for generating the secure software update concludes with the generation of an update package for distribution to target device locales using portable storage media, for example. The update package includes the package document generated previously, which may be an XML file, the executable update file, and the files that are to be used for performing the software update. The generated update package is a compliment of the utility and contents of the target device that is to receive the software update, so that the combination of the target device utility and update package can function together to implement a secure software update.

Figure 3:
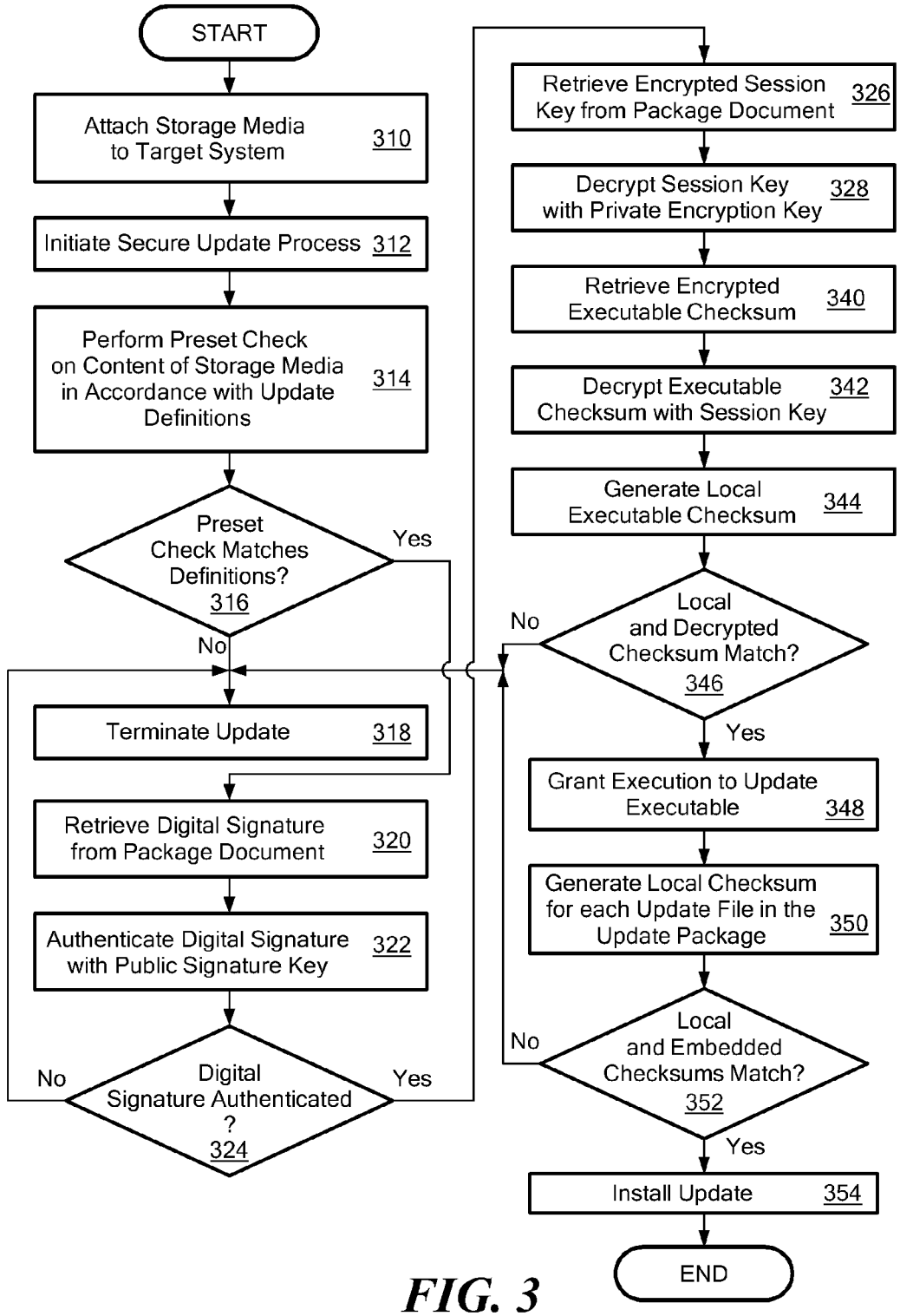

Referring now to FIG. 3, a flowchart 300 illustrates a software update installation process in accordance with the present disclosure. The software update process illustrated in flowchart 300 begins with the connection or attachment of the storage media to the target system or device, as illustrated in block 310. The update storage media includes the update package for performing the secure software update that is to be verified and installed in the target device. In accordance with an exemplary embodiment of the present disclosure, the software update process is initiated from the target device, although it is possible to permit the update to be initiated with executable software stored on the storage media. Initiation of the secure update process, as illustrated in block 312, can be implemented with the target device, for example, by permitting a user with administrative privileges to select a software update option provided in the target device. The software update option may cause activation of the update utility that is provided to the target device, along with the components for implementing the secure software update, as illustrated in FIG. 1, for example.

Upon initiation of the secure update process, the target device performs a preliminary predetermined check on the contents of the storage media to verify that the contents are as expected. The expectations relating to the content and character of the files placed on the storage media are defined by an update definition that is previously provided to the target device. For example, the update definition may specify a certain tag or identifier for files located on the storage media, and may specify a particular location for various tags, identifiers or files on the storage media. The check on the content of the storage media in accordance with the updated definition is illustrated in block 314 of flowchart 300. If the content of the storage media does not match the expectations specified in the update definition, as is illustrated in decision block 316, the software update is terminated, as illustrated in block 318 that is reached via the No branch of decision block 316. If the software update terminates prior to installation, a message can be conveyed to the user that the software update installation terminated or failed.

If the contents of the storage media meet the expectations specified by the update definition, the storage media contents are considered to have passed this threshold test, and the software update installation process can continue, as indicated by the Yes branch being taken from decision block 316. The software update installation process continues with the retrieval of the digital signature and the first data block representing the encrypted session key from the package document to permit authentication of the update package, as illustrated in block 320.

The digital signature is processed with a public signature key, which has been provided to the target device previously to permit authentication of the source and integrity of the data protected by the digital signature. The public signature key is used to decrypt the digital signature to obtain a second data block that represent the encrypted session key, as obtained from the digital signature. The second data block is then compared to the first data block that was retrieved from the package document representing the encrypted session key. The steps of decrypting the digital signature with the public signature key and comparing the so obtained second data block with the first data block to authenticate the digital signature may optionally be performed with a software module dedicated to digital signature authentication. The authentication operation is illustrated in block 322 of flowchart 300, with a result that indicates whether the source of the software update is verified.

A decision block 324 illustrates the determination of whether the digital signature is authenticated. If the digital signature is not authenticated, meaning that the calculated and processed hash values, for example, do not match, the software update is terminated, as illustrated by the No branch from decision block 324 to block 318. If the digital signature is authenticated, the software update installation process continues, as illustrated with the Yes branch from decision block 324.

If the digital signature is properly authenticated, the secure software update process continues with decryption of the encrypted session key, as illustrated in block 328. The encrypted session key is decrypted using the private decryption key, where the private decryption key was previously provided to the target device as part of the update utility. The process continues by retrieving the encrypted checksum for the executable update file, as illustrated in block 340, and decrypting the executable checksum with the decrypted session key, as illustrated in block 342. The executable checksum thus becomes available for use in verifying the integrity of the executable update file, with a relatively high level of assurance that the checksum has not been tampered with or corrupted, so that validation and verification of the software update can proceed in the target device with a high level of confidence that the software update is not corrupted or contains any viruses or comes from a source other than the originating developer or provider.

The verification of the update executable file continues with the local generation of a checksum for the executable file, as illustrated in block 344. The local checksum is compared to the checksum from the update package, as produced as described above, to determine the integrity of the executable update file. The determination of whether the checksums match is illustrated in decision block 346. If the checksums do not match, the software update installation is terminated, as illustrated by the No branch from decision block 346 to block 318.

If the checksums do match, execution can be granted to the executable update file, as illustrated by the Yes branch from decision block 346 to block 348. Up until execution is granted to the executable update file, the processing illustrated in flowchart 300 can be implemented through the target device retrieving data from the storage media and processing the data to validate and verify the software update. Once execution control is granted to the executable update file, the executable update file may be loaded into memory in the target device and executed by the onboard processor to implement the update installation.

One of the operations conducted by the executable update file is to locally generate checksums for each of the files that are contained in the update package to ensure the integrity of the update files as illustrated in block 350. The checksums can be generated using the MD5 algorithm, and are compared with the checksums embedded in the executable update file to determine if the checksums match. A decision block 352 illustrates the comparison of the locally generated and embedded checksum values to determine if the checksums match. If any of the checksums do not match, the update installation is terminated, as illustrated with the No branch from decision block 352 to block 318. If the checksums do match, the executable update file processes the update files to install the software update in the target device in accordance with its installation configuration, as is illustrated with the Yes branch of decision block 352 directed to block 354. According to an exemplary embodiment of the present disclosure, the executable update file may execute to store data derived from the update files in persistent storage in the target device to cause the software for the target device to be updated.

Although the present disclosure describes a target device as generally being a computing device, the disclosed systems and methods can be generally implemented with target devices, systems or methods that may not always be thought of in terms of computing devices. Examples of such targets that may employ the presently disclosed systems and/or methods include televisions, mobile phones, automotive vehicles, medical instrumentation, as well as typical targets for software updates such as database applications or embedded systems. In general, the disclosed systems or methods may be applied with any type of processing system that executes software.

The operations herein described are purely exemplary and imply no particular order. Further, the operations can be used in any sequence when appropriate and can be partially used. With the above embodiments in mind, it should be understood that the disclosed systems, devices, methods and/or uses can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the functions described herein may be performed by a processor executing program instructions out of a memory or other storage device. Therefore, it is the object of the appended claims to cover all such variations and modifications as come within the true spirit and scope of the present disclosure.

What is claimed is:

1. A system for implementing a software update on a target device, comprising:
   a target device having a processor coupled to a storage memory and being operable to retrieve and execute instructions stored in the storage memory to implement a checksum algorithm and an update utility, the update utility being operative to access the storage memory to perform a software update verification; wherein the storage memory stores a first encryption key from a first pair of asymmetrical cryptographic keys; and
   a storage device storing update data comprising an update process file and an update document, the update document including an encrypted checksum, and an encrypted session key, the encrypted session key being generated by encrypting a session key using a second encryption key from the first pair of asymmetrical cryptographic keys, the session key is a symmetrical cryptographic key, and the encrypted checksum being generated by encrypting a first checksum of the update process file in accordance with the checksum algorithm and encrypted using the session key;
   the update utility being operative:
      to receive, at the target device, in response to the storage device being attached to the target device, the update data stored on the storage device;
      to generate the session key by decrypting the encrypted session key of the update data using the first encryption key stored in the storage memory of the target device;
      to generate the first checksum by decrypting the encrypted checksum of the update data using the session key;
      to generate a second checksum based on the update process file using the checksum algorithm;
      to determine whether the first checksum matches the second checksum; and
      to grant execution to the update process file in response to determining that the first checksum matches the second checksum,
   wherein the update document and the update process file are stored at specific locations of the storage device with predetermined names in compliance with a pre-defined update definition, the pre-defined update definition describing an approved update data configuration and specifying a pre-defined location of the storage device storing specific data associated with the software update to enable the target device to form a security threshold and continue processing of the software update.

2. The system according to claim 1, wherein the storage memory of the target device further stores a first signature key from a second pair of asymmetrical cryptographic keys, and
   wherein the update utility is further operative to receive a digital signature stored on the storage device, the digital signature being generated with a second signature key from the second pair of asymmetrical cryptographic keys; and to authenticate the digital signature using the first signature key.

3. The system according to claim 2, wherein the first signature key is a public key from a public/private key pair.

4. The system according to claim 1, wherein the first encryption key is a private key from a public/private key pair.

5. The system according to claim 1, wherein the storage memory further stores an update definition that describes an approved update data configuration, wherein the update utility is operative to terminate the software update in response to determining that the update data stored on the storage device is noncompliant with the update definition.

6. The system according to claim 1, wherein the storage device is a removable external storage device selectively coupled to the processor.

7. The system according to claim 6, wherein the update data further comprises a digital signature, the digital signature being generated by encrypting at least the encrypted session key using a private signature key from a second pair of asymmetrical cryptographic keys.

8. The system according to claim 1, wherein the update utility is implemented in response to attachment of the storage device to the target device.

9. The system according to claim 1, wherein the target device comprises one of: a television, an automotive vehicle and a medical instrument.

10. The system according to claim 1, wherein the storage device comprises a flash drive memory.

11. The system according to claim 1, wherein the update utility is operated independently of whether a network communication link is active.

12. The system according to claim 1, wherein the checksum algorithm comprises a hash algorithm, the first checksum comprises a first hash value, and the second checksum comprises a second hash value.

13. A storage device for storing non-transitory update data for implementing a software update, comprising:
   a storage device connection configured to attach to a target device and, in response to the storage device being attached to the target device, to transmit update data comprising an update file and an update document to the target device,
   the non-transitory update data comprising:
      the update file that is executable to install the software update on the target device; and
      the update document storing:
         an encrypted checksum that is generated by encrypting a checksum using a session key that is a symmetrical cryptographic key, the checksum being calculated from the update file in accordance with a checksum algorithm; and an encrypted session key generated by encrypting the session key using a first encryption key from a first pair of asymmetrical cryptographic keys, wherein the update document and the update file are stored at specific locations of the storage device with a predetermined name in compliance with a pre-defined update definition, the pre-defined update definition describing an approved update data configuration and specifying a pre-defined location of the storage device storing specific data associated with the software update to enable the target device to form a security threshold and continue processing of the software update.

14. The device according to claim 13, wherein the first pair of asymmetrical cryptographic keys is a public/private key pair and the first encryption key is a public key from the public/private key pair.

15. The device according to claim 13, wherein the update document further stores a digital signature generated by further encrypting the encrypted session key using a private key from a second pair of asymmetrical cryptographic keys.

16. The device according to claim 13, wherein the update document is an XML formatted file.

17. A method for implementing a software update on a target device that includes a numerical processor, comprising:

receiving, at a first device in response to attachment of a second device to the first device, update data stored on the second device, the update data comprising an update process file and an update document having an encrypted checksum, and an encrypted session key, wherein the update process file is configured to establish the software update, the encrypted session key being generated by encrypting a session key using a first encryption key from a first asymmetrical cryptographic key pair, the session key is a symmetrical cryptographic key, and the encrypted checksum is generated by encrypting a first checksum of the update process file in accordance with a checksum algorithm and encrypted using the session key;

generating the session key by decrypting the encrypted session key using a second encryption key from the first asymmetrical cryptographic key pair;

generating the first checksum of the update data by decrypting the encrypted checksum using the session key;

calculating a second checksum from the update process file in accordance with the checksum algorithm; and granting execution to the update process file in response to determining that the first checksum matches the second checksum, wherein the update document and the update process file are stored at specific locations of the storage device with predetermined names in compliance with a pre-defined update definition, the pre-defined update definition describing an approved update data configuration and specifying a pre-defined location of the storage device storing specific data associated with the software update to enable the target device to form a security threshold and continue processing of the software update.

18. The method according to claim 17, wherein the first asymmetrical cryptographic key pair is a public/private key pair and the second encryption key is a private key of the public/private key pair.

19. The method according to claim 17, further comprising:

comparing characteristics of the update data with an update definition stored on the first device, wherein the update definition describes the pre-defined update definition; and terminating the software update in response to determining that the characteristics are noncompliant with the update definition.

20. The system according to claim 17, wherein a first data block represents the encrypted session key stored on the second device and the method further comprises:

receiving, at the first device, a digital signature stored on the second device, the digital signature is generated by encrypting the encrypted session key using a private signature key from a second pair of asymmetrical cryptographic keys;

generating a second data block representing a form of the digital signature that is decrypted using a public signature key from the second asymmetrical cryptographic key pair; and authenticating the digital signature by comparing the first data block and the second data block.

21. A method for preparing a software update package to implement a software update and being stored in non-transitory form on a storage device, comprising:

preparing an update file that is executable to install the software update on a target system;

calculating a checksum for the update file;

generating an encrypted checksum by encrypting the checksum using a session key that is a symmetrical cryptographic key;

generating an encrypted session key by encrypting the session key with a first encryption key from a first pair of asymmetrical cryptographic keys; and storing update data comprising the update file and an update document having the encrypted checksum and the encrypted session key at specific locations of the storage device with predetermined names in compliance with a pre-defined update definition, the pre-defined update definition describing an approved update data configuration and specifying a pre-defined location of the storage device storing specific data associated with the software update to enable the target device to form a security threshold and continue processing of the software update, wherein the storage device is configured to transmit the update data to the target device in response to the storage device being attached to the target device.

22. The method according to claim 21, wherein the first encryption key is a public key from a public/private key pair.

23. The method according to claim 21, further comprising generating a digital signature by encrypting the encrypted session key using a private key from a second pair of asymmetrical cryptographic keys.

24. The method according to claim 23, further comprising storing the encrypted checksum, the encrypted session key and the digital signature in an update document on the storage device.

25. The method according to claim 24, wherein the update document is an XML formatted file.

* * * * *